T. DAVIS.
PISTON RING.
APPLICATION FILED JAN. 13, 1911.
1,004,631.
Patented Oct. 3, 1911.
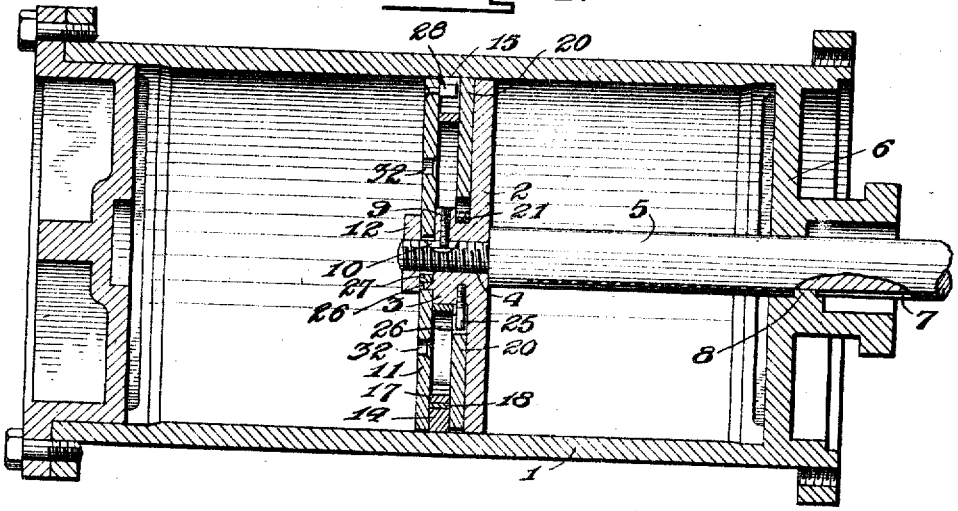
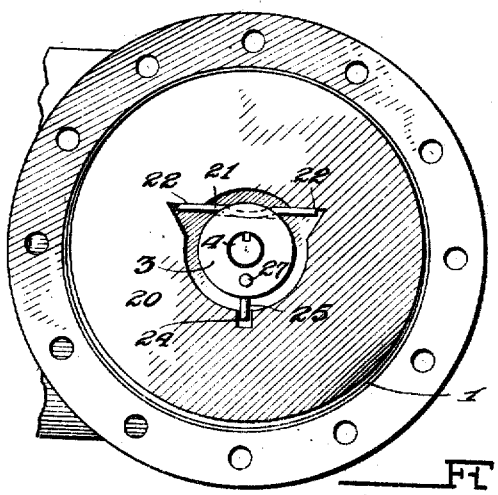
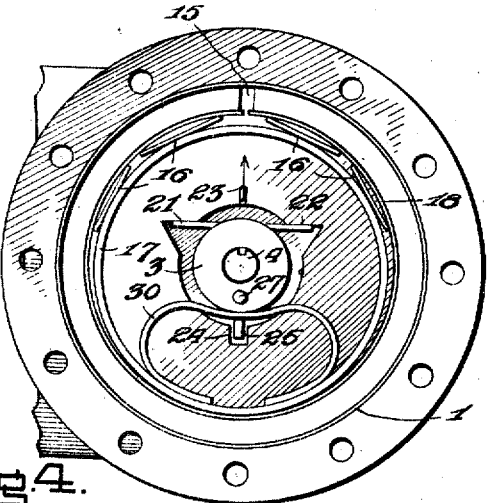
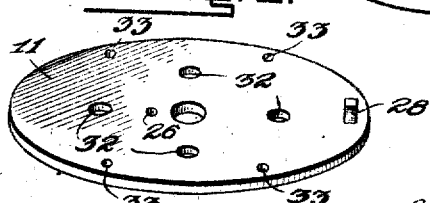
WITNESSES
INVENTOR
Thomas Davis
By Fredk W Winter
Attorney

UNITED STATES PATENT OFFICE.

THOMAS DAVIS, OF PITTSBURGH, PENNSYLVANIA.

PISTON-RING.

1,004,631.     Specification of Letters Patent.     Patented Oct. 3, 1911.

Application filed January 13, 1911. Serial No. 602,468.

*To all whom it may concern:*

Be it known that I, THOMAS DAVIS, a resident of Pittsburgh, in the county of Allegheny and State of Pennsylvania, have invented a new and useful Improvement in Piston-Rings, of which the following is a specification.

This invention relates to pistons for fluid pressure cylinders, and more particularly to the packing rings therefor.

The object of the invention is to provide a piston and ring construction whereby the gap left by the joint or split of the expansible ring is closed or obstructed by a supplemental device, so as to prevent the escape of the fluid pressure medium past the piston.

The invention comprises the construction and arrangement of parts hereinafter described and claimed.

In the accompanying drawing Figure 1 is a longitudinal section through a cylinder provided with my improved piston; Fig. 2 is a view of the piston head with the removable plate and expansible ring omitted; Fig. 3 is a similar view with merely the removable plate omitted; and Fig. 4 is a perspective view of the removable plate.

In the drawings 1 indicates a cylinder of any suitable type, form and size, which may be used either for steam, compressed air, gas under pressure, or water. The inlets and outlets of the cylinder are not indicated, as they form no part of the invention. The piston comprises a head 2 provided with a hub 3 and provided with an axial opening for receiving the threaded extension 4 of piston rod 5. The latter extends through an opening in head 6 of the cylinder, and if not connected to a cross-head or the like is prevented from rotary movement by being provided with a keyway 7 which is engaged by a projection 8 on the cylinder head 6. The head 2 also is prevented from rotary movement relative to the piston stem by means of a screw 9 tapped through a radial hole in the hub 3 and entering a slot or groove 10 in the threaded extension 4 of the piston rod. The face of the piston opposite the head 2 is formed by a plate 11 which is removably secured to the head and piston stem by means of nut 12 on the end of the threaded extension of said stem.

Between the removable plate 11 and head 2 is the packing ring and supplemental means. The packing ring is shown at 14, and this may be of metal, or soft material such as rubber or the like. This ring is split on one side, as at 15, so that it is free to expand. It may be expanded by any suitable spring or springs, the drawings showing a plurality of short plate springs 16 between the expansible ring 14 and a continuous ring 17 located within the packing ring. When the packing ring is of soft material, such as lead or rubber, its inner face is preferably reinforced by a metal ring 18 to prevent the springs 16 from cutting into the soft packing. This metal ring 18 likewise is split so that it easily expands under the action of springs 16. As the packing ring wears it will have to expand more and more, thereby opening to a larger degree the gap at 15. To prevent the fluid pressure medium from escaping through such gap I provide a supplemental device which comprises a circular ring or plate 20 located between the packing ring and the head. 2. This plate or ring 20 has a ground fit with the face of the head 2, so that fluid pressure cannot escape between the two. It loosely surrounds the hub 3 of the piston head and is merely pressed radially toward the cylinder walls in the direction of the location of the gap or split 15 in the packing ring. Any suitable spring arrangement can be used for this purpose. I have shown a flat spring 21 bearing against the hub 3 of the piston head and having its ends engaging shoulders 22 on the ring or plate 20. This spring is arranged to press the ring or plate 20 in the direction of the arrow 23, shown on Fig. 3, and against the wall of the cylinder at the point where the gap 15 in the packing ring occurs. Consequently the plate 20 forms a supplemental packing and closure for such gap and prevents fluid pressure from escaping through the latter.

To insure the plate 20 being at all times pressed in the direction in which the gap 15 is located, the parts must be held against relative rotation. To this end the plate 20 is provided with a notch 24 which is engaged by a radial stud 25 on the hub of the piston head. This prevents rotation of plate 20 relative to the head 2. Plate 11 is also held against rotation relative to the head 2 by being provided with a hole 26 into which extends a projection 27 on the end of the hub 3. Packing ring 14 is held against rotation relative to the other parts by means of a projection 28 carried by plate 11 and extending into the gap 15 between the ends of the packing ring. By this arrangement all of the parts of the piston are held in proper relative positions thereby insuring the spring 21 always pressing the supplemental plate or ring 20 in the direction occupied by the gap between the ends of the packing ring.

To counterbalance the action of spring 21 I provide a bowed spring 30 located diametrically opposite spring 21 and having its ends bearing against the inner face of ring 16 and intermediate its ends bearing against the hub 3 of the piston head. Holes 32 and 33 are preferably made in plate 11 to permit the pressure fluid to enter between the plate and the head and assist in expanding the packing ring and also to force it and the ring 20 against the head 2.

The operation of the parts described will be clearly understood from the foregoing description in connection with the drawings. The arrangement illustrated and described provides a perfect packing for the piston and enables the use of a packing ring formed of any desired material, and absolutely prevents the fluid pressure medium from escaping through the joint which necessarily is formed in all expansible packing rings.

What I claim is:

1. In a piston, the combination of a piston head, a split packing ring, a supplemental packing member having a tight fit between said packing ring and said head and movable radially to the axis of the piston, said packing ring and supplemental packing member being provided with flat side faces bearing against each other, and means for normally holding said supplemental member against the cylinder on the side where the split in the packing ring is located.

2. In a piston, the combination of a piston head, a split packing ring, a circular member having a tight fit between said ring and said head and movable radially to the piston, means for normally holding said circular member against the cylinder walls on the side where the split in the piston ring is located, and means for preventing relative rotation between the packing ring and said circular member.

3. In a piston, the combination of a piston head provided with a hub, a split packing ring, a supplemental member having a tight fit between said packing ring and said head, a spring arranged between said supplemental member and the hub of the piston head and normally pressing said supplemental member against the cylinder wall on the side where the split in the packing ring is located, and a counterbalancing spring arranged diametrically opposite said first named spring and bearing respectively on the hub of the piston head and against the packing ring.

4. In a piston, the combination of a piston head, a face plate secured to the piston head, a split packing ring, a supplemental packing member, said packing ring and supplemental packing member being located between the piston head and said face plate, means for normally pressing said supplemental packing member toward the cylinder wall on the side where the split in the packing ring is located, and means for holding all of said parts against relative rotation.

5. In a piston, the combination of a piston head, a face plate secured thereto, a pair of packing members having coöperating flat side faces bearing tightly together, said packing members located between said head and face plate, and springs arranged to press said packing members in diametrically opposite directions.

6. In a piston, the combination of a piston head, a piston rod, a split packing ring in the piston head, a supplemental packing member in said head, means for pressing the latter against the cylinder walls on the side where the split in the packing ring is located, said packing ring and supplemental packing member lying in different planes transverse to the axis of the piston head and having flat contacting faces, means for preventing rotation of the cylinder head on the piston rod, and means for preventing rotation of said split packing ring and said supplemental packing member relative to said head.

In testimony whereof I have hereunto set my hand.

THOMAS DAVIS.

Witnesses:
 ISAAC E. MCCRACKEN,
 P. MCGLASHAN.